United States Patent
Tsutsumi

(10) Patent No.: US 6,728,010 B1
(45) Date of Patent: Apr. 27, 2004

(54) COLOR IMAGE READER FOR USE IN IMAGE FORMING APPARATUS

(75) Inventor: Kazuyoshi Tsutsumi, Kawasaki (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 652 days.

(21) Appl. No.: 09/663,688

(22) Filed: Sep. 19, 2000

(51) Int. Cl.$^7$ ................................................. H04N 1/04
(52) U.S. Cl. .................... 358/475; 358/497; 358/474
(58) Field of Search ................................ 358/475, 509, 358/296, 497, 505, 474, 494, 483; 250/208.1, 234–236; 382/312, 318, 319; 359/212; 399/221, 220; 355/67; 362/296, 297

(56) References Cited

U.S. PATENT DOCUMENTS

| | | | | |
|---|---|---|---|---|
| 3,777,135 A | * | 12/1973 | Rees | 362/225 |
| 3,947,115 A | * | 3/1976 | Hamaguchi | 399/218 |
| 3,977,784 A | * | 8/1976 | Hara | 355/67 |
| 4,413,903 A | * | 11/1983 | Corona et al. | 355/68 |
| 4,473,865 A | * | 9/1984 | Landa | 362/6 |
| 4,483,609 A | * | 11/1984 | Harada | 399/221 |
| 4,891,739 A | * | 1/1990 | Yasuda | 362/296 |
| 5,760,924 A | * | 6/1998 | Takahara et al. | 358/474 |
| 6,236,470 B1 | * | 5/2001 | Seachman | 358/471 |
| 6,563,608 B1 | * | 5/2003 | Nakahara et al. | 358/475 |

FOREIGN PATENT DOCUMENTS

| | | |
|---|---|---|
| JP | 63-157737 U | 10/1988 |
| JP | 3-129965 A | 6/1991 |
| JP | 6-82933 | 3/1994 |
| JP | 6-178050 | 6/1994 |
| JP | 7-135553 A | 5/1995 |
| JP | 8-139860 A | 5/1996 |
| JP | 2001-242556 A | 9/2001 |

OTHER PUBLICATIONS

Japanese Patent Office—Office Action (Japanese Language), 2 pages; English translation dated Apr. 28, 2003, 3 pages.

* cited by examiner

Primary Examiner—Cheukfan Lee
(74) Attorney, Agent, or Firm—Foley & Lardner LLP

(57) ABSTRACT

An color image reader according to the present invention includes a holding glass for holding an object, the holding glass being a rectangular, plate-like, flat member having a pair of long sides and a pair of short sides perpendicular to each other at right angles, an illuminating unit having an xenon lamp and a reflector both for illuminating the object placed closely on one side of the holding glass, the xenon lamp emitting light toward an irradiation range to irradiate the object, and the reflector having a first reflection plane and a second reflection plane to irradiate the irradiation range in a direction along the planes of the holding glass from a direction opposite to a direction of the light emitted from the xenon lamp, a reduction lens for providing an image-forming characteristic to light reflected by the object on the holding member illuminated by the illuminating unit, and a CCD sensor for receiving the reflected light to which the reduction lens provides the image-forming characteristic, and outputting an electrical signal corresponding to the reflected light. Even though a document to be read is formed by pasting two sheets and thus has a step, a shade can be prevented from occurring in the step.

4 Claims, 6 Drawing Sheets

COLOR IMAGE READER FOR USE IN IMAGE FORMING APPARATUS

BACKGROUND OF THE INVENTION

The present invention relates to an image reader for reading image data and an electrophotographic image forming apparatus including the image reader.

An image reader (scanner) for reading image data, which is used in an image forming apparatus, is shaped almost like a plate and includes a transparent document holding section (document glass) for holding an object to be read, such as a sheet-like document, a book and a solid object, an illuminating lamp, and a reflector. The image reader also includes an illuminating unit for illuminating the object set on the document glass, a CCD sensor for converting an image contained in the object into an electrical signal upon receiving light reflected from the object illuminated with illuminating light emitted from the illuminating unit, and an optical set (a plurality of mirrors and a focusing lens) provided between the document glass and the CCD sensor. An analog electrophotographic apparatus using an exposing mirror and a photosensitive drum in place of the CCD sensor, for directly guiding light, which is reflected from an object to be read, to the photo-sensitive drum, includes a document glass (document holding section), an illuminating unit and an optical set which are similar in structure to those of the above image reader (scanner).

In the foregoing image reader (scanner), the illuminating unit and some mirrors of the optical set are formed along and longer than the short side of the document glass, and moved at a given speed in the direction along the long side thereof perpendicular to the short side at right angles. Thus, an image to be scanned is picked up as variations of light and shade within a long irradiation range along the first direction (the short side of the document glass) defined by the illuminating light from the illuminating lamp and mirrors, and then guided onto the light-receiving surface of the CCD. When the illuminating lamp and mirrors are moved in the second direction (the long side of the document glass) crossing the first direction at right angles, the entire image of the object to be scanned is picked up as variations of light and shade and guided onto the light-receiving surface of the CCD sensor.

If the object to be scanned is a sheet-like document formed by pasting a sheet document (second sheet) on a mount sheet (first sheet), a shade is likely to occur in a boundary between the first and second sheets. The thicker the second sheet, the clearer the shade. The cause thereof is unbalanced light emitting from the illuminating unit toward the sheet-like document, the unbalanced light being a difference between the intensity of light traveling along the second direction in which the illuminating lamp and mirrors move and that of light traveling in the direction opposite to the first direction. When a difference in level between the pasted sheets occurs at an end portion of the document, a shade appears at the edge of the document when the document is illuminated. This shade can be eliminated by software if a non-scanning area is set (at the time of scanning by the scanner). However, when the second sheet is small and located in or close to the central part of the first sheet or when a small document is to be located in the central part of a large paper sheet, a shade is unlikely to be eliminated by software even though a non-scanning area is set. Furthermore, even though a specific image process can be performed to delete the shade, an image whose density is lower than that of the shade will be deleted simultaneously.

In order to improve the unbalanced light from illuminating unit, an idea of using two lamps to make the intensity of light traveling in the moving direction and that of light traveling in the direction opposite to the moving direction equal to each other, has been proposed (put to practical use). If, however, two lamps are used, the coincidence of brightness (coincidence of intensity of light from the two lamps) is required and naturally the costs are increased. To heighten the reflectivity of a reflector has also been proposed (put to practical use), however, a reflector having a high reflectivity is expensive and its loss is about 10% when it reflects the light. The brightness is therefore lower that that in the case using two lamps. Further, a method of collecting the light reflected by the reflector having a curved surface within an irradiation range, has been put to practical use, but the reflector itself increases in cost. In this case, the width of the irradiation range and that of the collected reflected light are shifted from each other, and the amount of light received by the CCD sensor is greatly varied with a mounting error of the CCD sensor.

BRIEF SUMMARY OF THE INVENTION

An object of the present invention is to provide an illuminating apparatus for reading/copying an object having a portion of different thickness varies without causing any undesired image in the portion.

Another object of the present invention is to provide an image reader which causes no shade in an object having a difference in level when the object is illuminated.

Still another object of the present invention is to provide an image reader or an image forming apparatus which is capable of reading/copying an image free of shade by irradiating an object with illuminating light having almost uniform light intensity from different two directions using both of a virtual light source constituted of the reflector and an illuminating lamp.

An image reader according to a first aspect of the present invention comprises:
  a holding member for holding an object to be read, the holding member being a rectangular, plate-like, flat member having two pairs of sides perpendicular to each other at right angles;
  an illuminating unit, including a tube-like lamp and provided in parallel with one of the two pairs of sides of the holding member, for illuminating an area having a given range on the holding member;
  a reflector, provided along the lamp of the illuminating unit, for converging the light from the object to the holding member;
  a converging lens for converging the light reflected by the object on the holding member illuminated by the illuminating unit and the reflector; and
  a CCD sensor for receiving the light focused by the focusing lens and outputting an electrical signal corresponding to the received light.

An image forming apparatus according to a second aspect of the present invention comprises:
  a holding glass for holding an object, the holding glass being a rectangular, plate-like, flat member having a pair of long sides and a pair of short sides crossing each other at right angles;
  an illuminating unit having a xenon lamp and a reflector both for illuminating the object placed on one side of the holding glass, the xenon lamp reflecting light toward an irradiation range in order to irradiate the object, and the reflector having a first reflection plane and a second reflection plane and emitting light toward the irradiation range from a direction opposite to a direction of the light emitted from the xenon lamp in order to irradiate the holding glass;

a converging lens for providing an image-forming characteristic to the light reflected by the object on the holding member illuminated by the illuminating unit; and a CCD sensor for receiving the light to which the image-forming characteristic is provided by the converging lens, and outputting an electrical signal corresponding to the received light.

An image forming apparatus according to a third aspect of the present invention comprises:

an image reader including:

a holding glass for holding an object, the holding glass being a rectangular, plate-like, flat member having a pair of long sides and a pair of short sides crossing each other at right angles a holding glass for holding an object, the holding glass being a rectangular, plate-like, flat member having a pair of long sides and a pair of short sides crossing each other at right angles;

an illuminating unit having a xenon lamp and a reflector both for illuminating the object placed on one side of the holding glass, the xenon lamp reflecting light toward an irradiation range in order to irradiate the object, and the reflector having a first reflection plane and a second reflection plane and emitting light toward the irradiation range from a direction opposite to a direction of the light emitted from the xenon lamp in order to irradiate the holding glass;

a focusing lens for focusing the light reflected by the object on the holding member illuminated by the illuminating unit; and a CCD sensor for receiving the light focused by the focusing lens and outputting an electrical signal corresponding to the received light;

a converging lens for providing an image-forming characteristic to the light reflected by the object on the holding member illuminated by the illuminating unit; and a CCD sensor for receiving the light to which the image-forming characteristic is provided by the converging lens, and outputting an electrical signal corresponding to the received light;

an exposing unit for emitting exposure light, whose intensity varies with an output image signal generated from the image reader, to a predetermined position;

an image forming unit having a photo-sensitive body serving as a light acceptor, a developing unit capable of selectively supplying a visualizing material to the photo-sensitive body, and a transfer unit for transferring the visualizing material from the photo-sensitive drum to an image-transferred member, for forming a visualizing-material image by supplying the visualizing material to a latent image formed on the photo-sensitive body by the exposure light emitted from the exposing unit;

an image-transferred member feeding mechanism for feeding the image-transferred member to the transfer unit to transfer the visualizing-material member formed by the developing unit by the transfer unit of the image forming unit; and a fixing unit for fixing the visualizing-material image on the image-transferred member fed by the image-transferred member feeding mechanism.

DETAILED DESCRIPTION OF THE INVENTION

Referring to the accompanying drawings, a digital copying machine will now be described as an example of an image forming apparatus according to an embodiment of the present invention.

Figure 1:
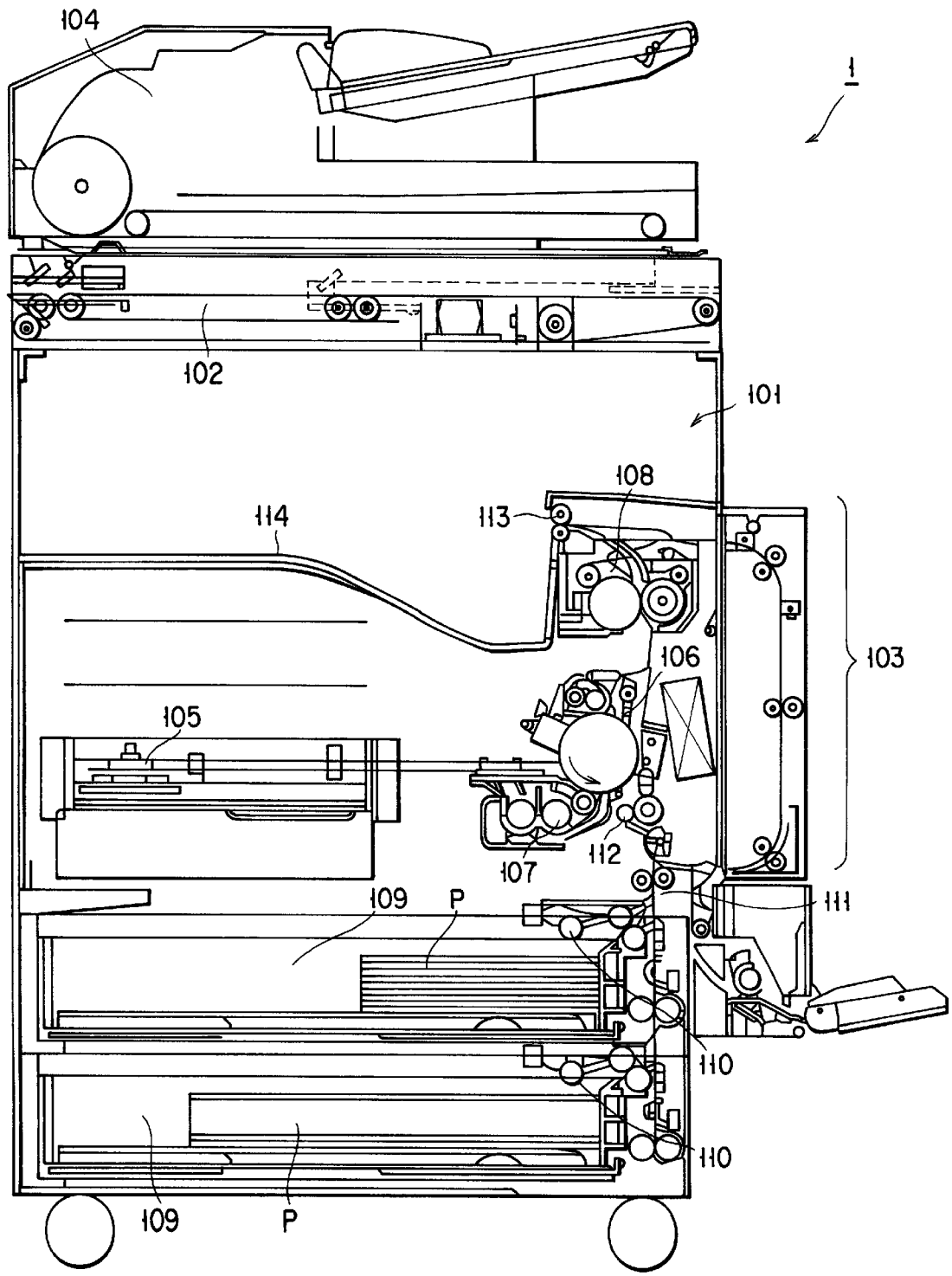
FIG. 1 is a schematic view explaining an example of an image forming apparatus into which an image reader of the present invention is incorporated.

As illustrated in FIG. 1, the digital copying machine 101 includes a scanner 102 for reading image information of an object to be copied as variations of light and shade and generating an image signal and an image forming unit 103 for forming an image in response to the image signal from the scanner 102 or that from an external device. The scanner 102 is provided integrally with an automatic document feeder (ADF) 104 as one unit. To copy sheet-like objects, the ADF 104 feeds them in sequence in association with an image reading operation of the scanner 102.

The image forming unit 103 has an exposing unit 105 for emitting a laser beam corresponding to the image signal supplied from the scanner 102 or the external device, a photo-sensitive drum 106 for holding an image corresponding to the laser beam emitted from the exposing unit 105, a developing unit 107 for receiving a developer and developing the image formed on the photo-sensitive drum 106 to form a developer image, and a fixing unit 108 for heating and fusing the developer image, which is transferred from the photo-sensitive drum 106 to an image-transferred member (paper P) fed by means of a paper feeding unit, which will be described below, and fixing it on the image-transferred member.

Upon receiving image information from the scanner 102 or the external device, the photo-sensitive drum 106, which is charged with a prescribed potential, is irradiated with a laser beam whose intensity is modulated by the image information, from the exposing unit 105. Thus, an electrostatic latent image corresponding to the image to be copied is formed on the photo-sensitive drum 106.

The developing unit 107 is selectively supplied with toner T to develop the electrostatic latent image formed on the photo-sensitive drum 106 and convert it into a toner image (not shown). Paper P is picked up from a paper cassette 109 by means of a pickup roller 110 and conveyed to the photo-sensitive drum 106 through a conveying path 111. The paper P is aligned with the toner image on the photo-sensitive drum 106 by an aligning roller 112, and the toner image is transferred to the paper P in a transfer position opposed to a transfer unit (not indicated by reference numeral).

The paper P to which the toner image is transferred, is conveyed to the fixing unit 108. In the fixing unit 108, the toner T is fused and the toner image is fixed on the paper P.

The paper P on which the toner image is fixed with the toner using the fixing unit 108, is discharged into a discharge space (discharge tray) 114, which is located between the scanner 102 and the paper cassette 109, by means of a discharge roller 114.

Figure 2:
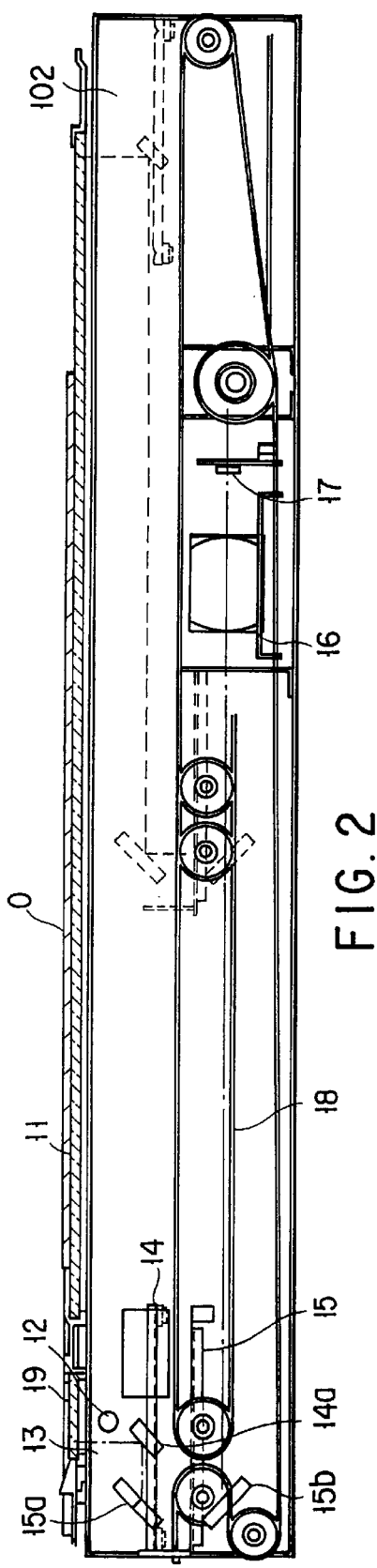
FIG. 2 is a schematic view explaining the image reader incorporated into the image forming apparatus shown in FIG. 1.
Figure 3:
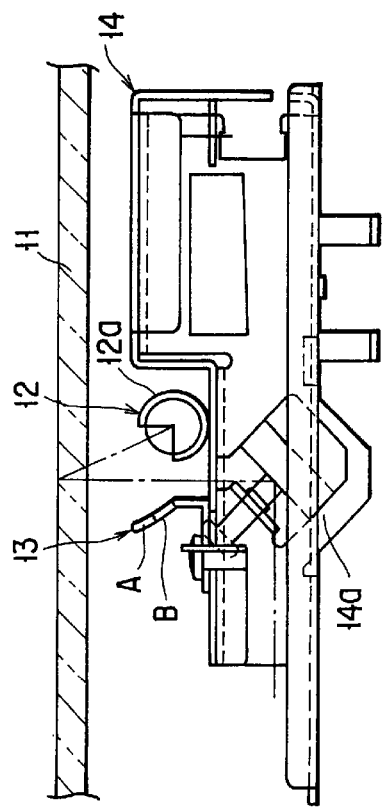
FIG. 3 is a schematic view explaining an illuminating unit of the image reader shown in FIG. 2.

FIG. 2 is a schematic view explaining an example of an image reader (scanner) incorporated into the image forming apparatus shown in FIG. 1. FIG. 3 is an enlarged, partial cross-sectional view of an illuminating lamp and a reflector of the image reader shown in FIG. 2.

As shown in FIGS. 2 and 3, the image reader 102 includes a document glass 11 for holding a document O as an object to be read (copied), and the document glass is a plate-like, flat member having an almost uniform thickness. A tube-like illuminating lamp 12 extends parallel to an one side of the document glass is provided under and faced to a surface opposed with a surface contact to the document O of the document glass 11 and supplied with electric power to emit light and illuminate the document O. A reflector 13 is also provided under the document glass 11 to reflect the light from the illuminating lamp 12 and apply it to the document glass 11. The illuminating lamp 12 and reflector 13 are formed along and longer than the short sides of the document glass 11 and moved at a given speed along the long sides of the document glass 11. Thus, an image of the document O is picked up as variations of light and shade within a long irradiation range along the first direction (the short sides of the document glass) defined by the illuminating lamp 12 and mirrors, and then guided to the light-receiving surface of a CCD sensor 17. When the illuminating lamp and mirrors are moved in the second direction (along the long sides of the document glass) crossing the first direction at right angles, an image of the entire document O is picked up as variations of light and shade and guided to the light-receiving surface of the CCD sensor.

The illuminating lamp 12 and reflector 13 are fixed to a first carriage 14 which can be moved along the surface of the document glass 11. For example, the illuminating lamp 12 is an xenon lamp. The lamp 12 includes an arc-shaped reflector body 12a provided with outer circumference on thereown in an area which does not face the document O (document glass 11), the document glass cannot be illuminated to the area, that is, the light emitted from the area of the lamp 12 cannot reach the document O due to its own shade. In other words, most of the illuminating lamp 12 is covered with the reflector body 12a, and only the area of the lamp 12 from which light can be emitted to illuminate the document O, is not provided with the reflector body 12a.

The first carriage 14 includes a first image mirror 14a for guiding reflected light, which is a variation of light and shade due to a difference in reflectivity between an image and a non-image of the document O, in a predetermined direction by illuminating the document O with the light emitted from the illuminating lamp 12 and the light reflected by both of a reflector A and a reflector B (of the reflector 13).

Second and third image mirrors 15a and 15b for guiding the light from the first image mirror 14a in a predetermined direction, are arranged in the direction of the light reflected from the document O and guided by the first image mirror 14a. The reflection planes of the mirrors 15a and 15b form an angle of 90°. Further, the mirrors 15a and 15b are integrally incorporated into a second carriage 15, which is driven by the first carriage 14 at a given speed, when the first carriage 14 moved in parallel with the document glass 11. Thus, the light reflected from the document O and guided by the first image mirror 14a is returned within a plane which is parallel with the surface of the document glass 11.

A lens 16 for reducing the light reflected by the third image mirror 15b at a given magnification, is provided in the direction of the light reflected from the document O and guided by the third image mirror 15b. The light reflected by the third image mirror 15b is belt-like light which is restricted by the whole length of the illuminating lamp 12 in its axial direction and the width thereof defined when the first image mirror 14a reflects the light from the document O. The CCD sensor 17 is located on the focal point of the lens 16 to photoelectrically convert the light on the light-receiving surface and output an electrical signal corresponding to the intensity of the light. The light-receiving surface of the CCD sensor 17 and the focal point of the lens 16 coincide with each other. The first and second carriages 14 and 15 reciprocate along the document glass 11 by driving force supplied from a motor (not shown) to a wire rope 18 both ends of which are fixed. A white-level reference value of the CCD sensor 17 is calibrated, when the image reader 102 (image forming apparatus 1) turns on, based on the light reflected by the illuminating lamp 12 and reflector 13 and illuminating a white reference plate 19 which is provided in a given position (called a home position) before the distal end of the document glass 11 in the second direction when the first carriage 14 moves along the document glass 11.

Figure 4:
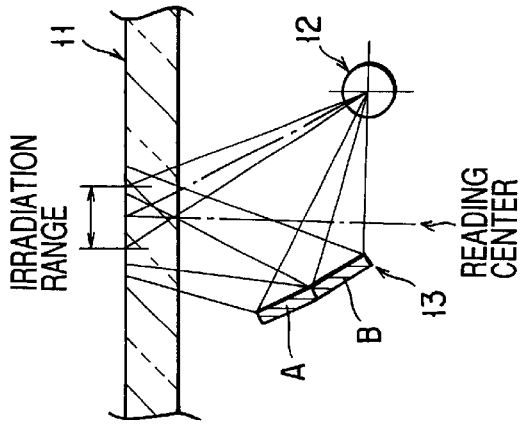
FIG. 4 is a schematic view explaining the shape and layout of a reflector of the illuminating unit shown in FIG. 3.

FIG. 4 is a schematic view explaining a characteristic shape of the reflector of the image reader shown in FIGS. 2 and 3 and a relationship in position between the reflector and the document glass.

As illustrated in FIG. 4, the light emitted from the illuminating lamp 12 and reflector 13 forms an irradiation range having a given width along the short sides of the document glass 11 on the top surface of the glass 11 on which the document O is placed closely. The center of the irradiation range coincides with that of an image guided by the CCD sensor 17 or the reading center. Consequently, the irradiation range has a predetermined width before and behind in the second direction along which the first and second carriages 14 and 15 move.

As is apparent from FIG. 4, the reflector 13, which is a plate-like, flat member, is bent at a given angle in a given position in the first direction to form first and second reflectors A and B.

The first and second reflectors A and B are formed, as will be described later, so as to illuminate the document O on the glass 11 with light whose quantity is almost equal to that of light emitted from the xenon lamp 12. These reflectors A and B can be formed as two separate reflectors (flat members) as well as a single flat member which is bent as described above.

Figure 5A:
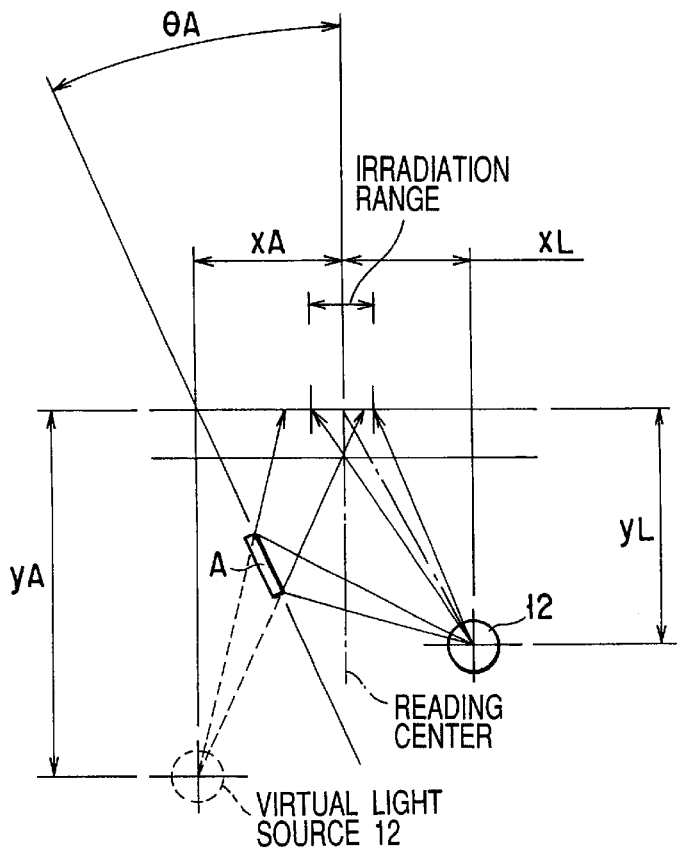
FIG. 5A is a schematic view explaining the shape and layout of a first reflector of the reflector of the illuminating unit shown in FIG. 4.

FIG. 5A is a schematic view explaining a characteristic shape of the first reflector A of the reflector 13 shown in FIG. 4 and a relationship in position between the first reflector A and the document glass 11.

As illustrated in FIG. 5A, when a direction parallel to the document glass 11 is X and a direction perpendicular to the document glass 11 is Y, the illuminating lamp 12 is defined by two distances XL and YL, and the first reflector A is so arranged that it can reflect the light from the illuminating lamp 12 to the irradiation range of the document glass 11 as in the case where a virtual light source (12) is located in a position defined by two distances XA and YA. As shown in FIG. 4, the first reflector A is closer to the document glass 11 than the second reflector B, and an angle θA between the reflector A and the reading center is defined as, for example, 25°.

Figure 5B:
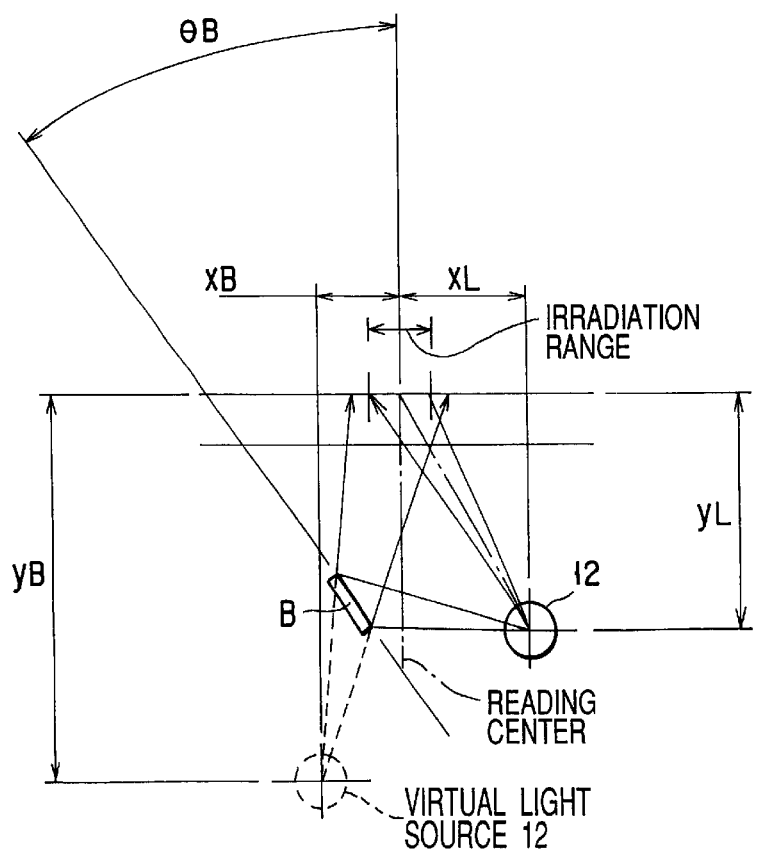
FIG. 5B is a schematic view explaining the shape and layout of a second reflector of the reflector of the illuminating unit shown in FIG. 4.

FIG. 5B is a schematic view explaining a characteristic shape of the second reflector B of the reflector 13 shown in FIG. 4 and a relationship in position between the second reflector B and the document glass 11.

As illustrated in FIG. 5B, when a direction parallel to the document glass 11 is X and a direction perpendicular to the document glass 11 is Y, the illuminating lamp 12 is defined by two distances XL and YL, and the second reflector B is so arranged that it can reflect the light from the illuminating lamp 12 to the irradiation range of the document glass 11 as in the case where a virtual light source (12) is located in a position defined by two distances XB and YB. As shown in FIG. 4, the second reflector B is at a greater distance from the document glass 11 than the first reflector A, and an angle θB between the second reflector B and the reading center is defined as, for example, 35°.

The positions of the first and second reflectors A and B shown in FIGS. 5A and 5B with respect to the document glass 11, will now be described with reference to TABLE 1.

As shown in TABLE 1, the light intensity in the irradiation range of the document glass 11 is obtained by varying the distance between each of the reflectors A and B and the document glass 11, and the positions of the reflectors are specified such that a difference between the light intensity in the irradiation range and that of illuminating light from the illuminating lamp 12 located in a given position.

TABLE 1

Figure 6A:
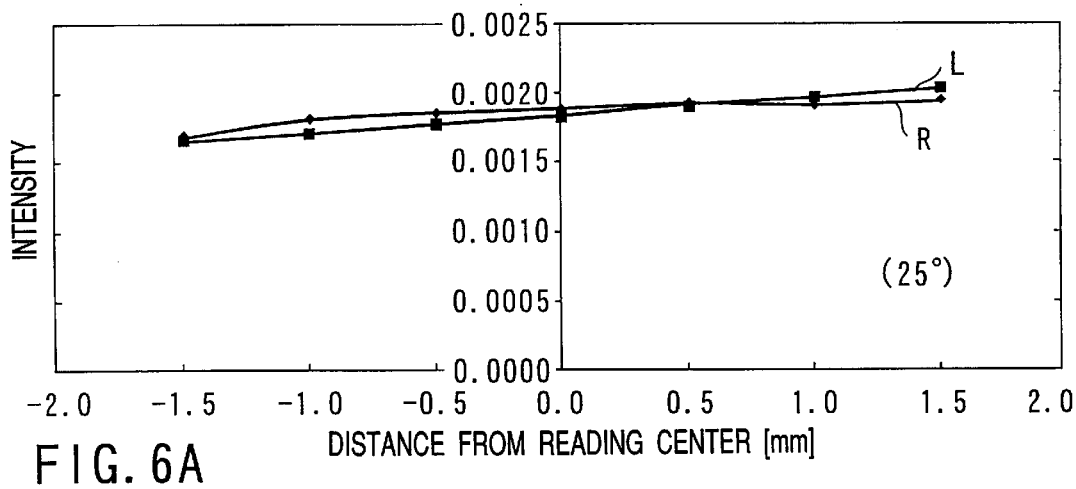
FIG. 6A is a graph explaining a deviation of illuminating light emitted under condition C (the angle of the first reflector is set to 25°) of TABLE 1 in the reflector shown in FIG. 4.
Figure 6B:
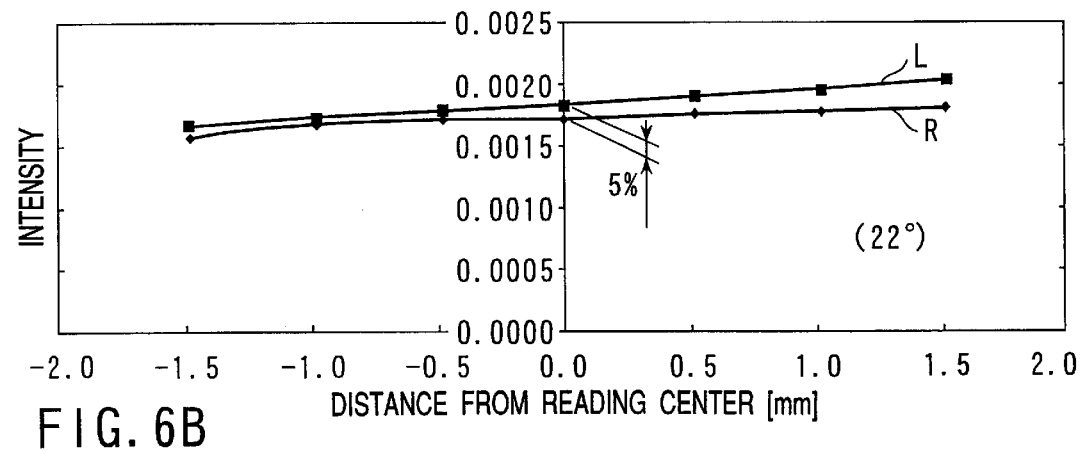
FIG. 6B is a graph explaining a deviation of illuminating light emitted under condition D (the angle of the first reflector is set to 22°) of TABLE 1 in the reflector shown in FIG. 4.
Figure 6C:
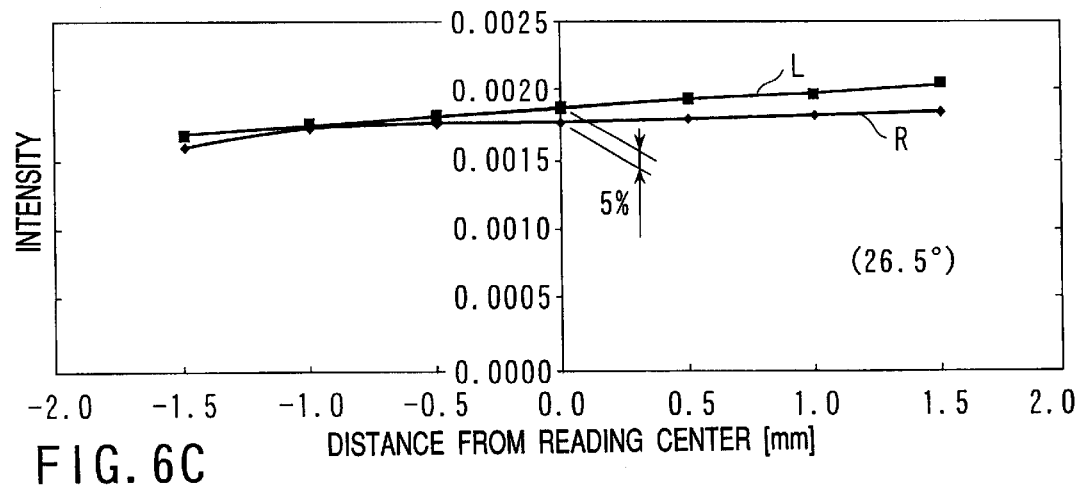
FIG. 6C is a graph explaining a deviation of illuminating light emitted under condition E (the angle of the first reflector is set to 26.5°) of TABLE 1 in the reflector shown in FIG. 4.
Figure 8A:
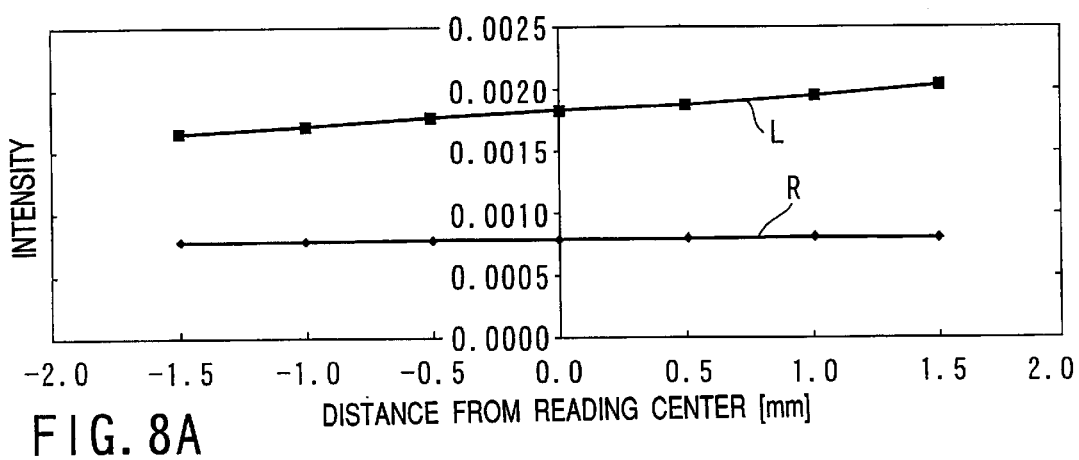
FIG. 8A is a graph explaining a deviation of illuminating light emitted under condition A (only the first reflector is arranged) of TABLE 1.
Figure 8B:
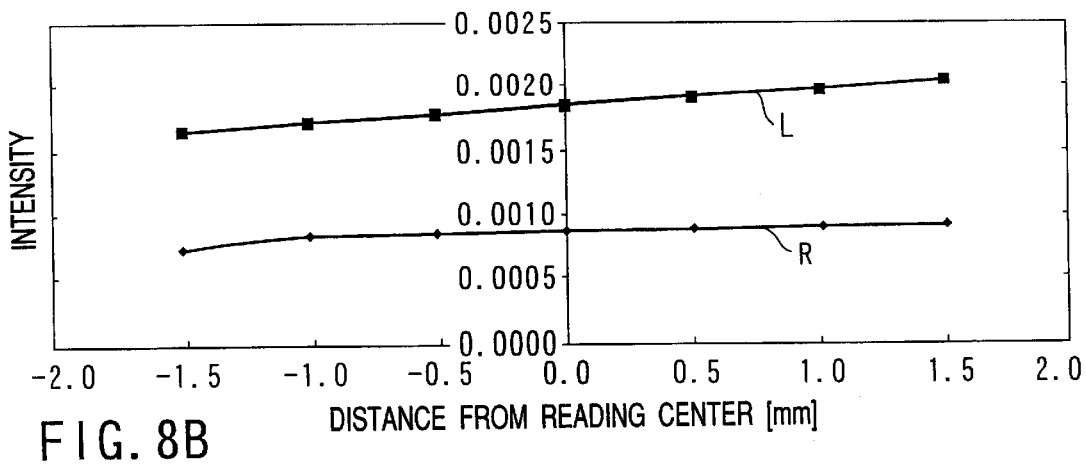
FIG. 8B is a graph explaining a deviation of illuminating light emitted under condition B (only the second reflector is arranged) of TABLE 1.
Figure 9:
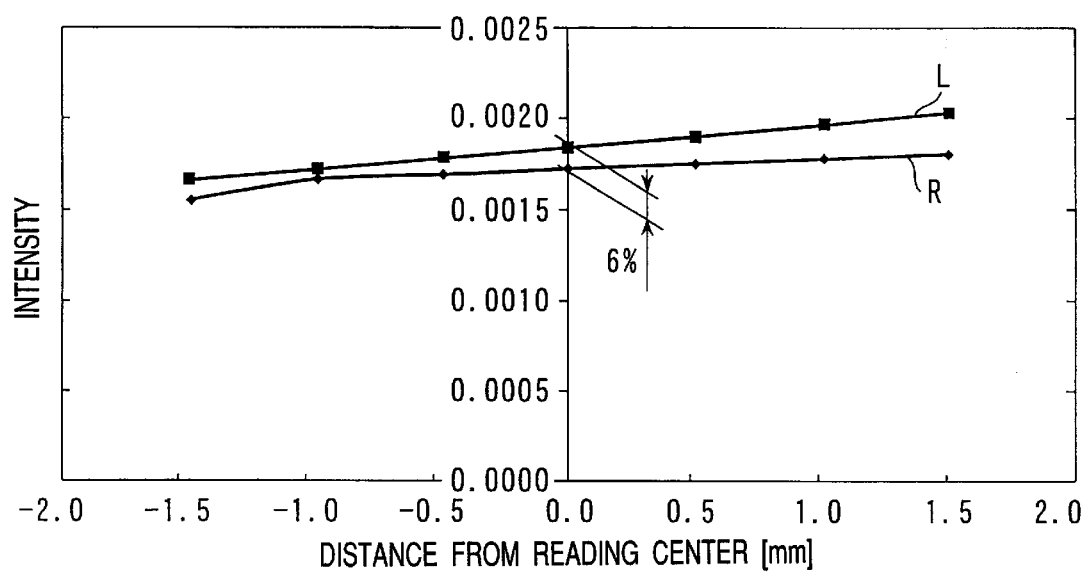
FIG. 9 is a graph explaining a deviation of illuminating light emitted under condition F (the angle of the first reflector is set to 21.5°, which corresponds to the prior art) of TABLE 1 in the reflector shown in FIG. 4.

| SAMPLES<br>FIGURES | | | A<br>FIG. 8A | B<br>FIG. 8B | C<br>FIG. 6A | D<br>FIG. 6B | E<br>FIG. 6C | F<br>FIG. 9 |
|---|---|---|---|---|---|---|---|---|
| REFLECTOR<br>13 | REFLECTOR<br>A | xA (mm) | 12.1 | — | 12.1 | 15.6 | 10.5 | 16.0 |
| | | yA (mm) | 29.6 | — | 29.6 | 29.6 | 29.6 | 29.6 |
| | | A TOTAL UTILIZATION RATE | 0.00103 | — | 0.00103 | 0.00089 | 0.00109 | 0.00088 |
| | | θA (°) | 25.0 | — | 25.0 | 22.0 | 26.5 | 21.5 |
| | REFLECTOR<br>B | xB (mm) | — | 6.6 | 6.6 | 6.6 | 6.6 | 6.6 |
| | | yB (mm) | — | 31.0 | 31.0 | 31.0 | 31.0 | 31.0 |
| | | B TOTAL UTILIZATION RATE | — | 0.00097 | 0.00097 | 0.00097 | 0.00097 | 0.00097 |
| | | θB (°) | — | 35.0 | 35.0 | 35.0 | 35.0 | 35.0 |
| | A + B UTILIZATION RATE | | 0.0010 | 0.00097 | 0.00220 | 0.00205 | 0.00206 | 0.00204 |
| | REFLECTIVITY OF REFLECTOR | | 0.85 | 0.85 | 0.85 | 0.85 | 0.85 | 0.85 |
| | INTENSITY (1×) | | 0.0009 | 0.00083 | 0.00187 | 0.00175 | 0.00175 | 0.00173 |
| LAMP 12 | LAMP L | xL (mm) | 10.6 | ← | ← | ← | ← | ← |
| | | yL (mm) | 19.0 | ← | ← | ← | ← | ← |
| | | L TOTAL UTILIZATION RATE | 0.00184 | ← | ← | ← | ← | ← |
| | INTENSITY (1×) | | 0.00184 | ← | ← | ← | ← | ← |
| DIFFERENCE OF INTENSITY | | | 53 | 55 | −2 | 5 | 5 | 6 |

TABLE 1 shows a difference in light intensity in each of samples A to F. Only the first reflector A is used in sample A and only the second reflector B is used in sample B. In samples C to F, two reflectors A and B are employed, and the angle of the reflector B is fixed to 35°, while that of the reflector A is varied. TABLE 1 also shows the intensity of light reflected by each of the reflectors, that of light reflected by both of the reflectors, that of light emitted from only the illuminating lamp 12, and that of light applied to the irradiation range from the two reflectors and the illuminating lamp 12.

In TABLE 1, "L TOTAL (lamp 12)" indicates a ratio of the light intensity of light emitted from the actual illuminating lamp 12 to that of the irradiation range of the document glass 11 when the latter light intensity is "1" if the illuminating lamp 12 is provided within the irradiation range. "A TOTAL (reflector A)" and "B TOTAL (reflector B)" each indicate a degree of light reflected by the reflector when the light intensity of the irradiation range of the document glass 11 is "1" if the illuminating lamp 12 is provided within the irradiation range (the degree of light corresponding to a value obtained by subtracting a value, which is obtained by dividing the light intensity of the reflector by that of the lamp 12, from "1"). The light intensity in each reflector is slightly lower than the "A TOTAL" or "B TOTAL" under the influence of the reflector's own light absorption. "A+B UTILIZATION RATE" represents the utilization rate of the light emitted from the lamp 12 when both of the reflectors are used.

As is apparent from TABLE 1, when only one of the reflectors A and B (in samples A and B), a difference in light intensity between the reflected light of the reflector and the illuminating light of the lamp 12 is "53" or "55" and if the reflector is incorporated into the image reader 102, a difference in intensity between the illuminating lights which are applied to the reading center from two directions is too large and thus it is inadequate to serve as a lighting apparatus.

It is also apparent that in samples C to E the angle θA of the reflector A favorably ranges from 22° to 26.5° (in sample F having an angle of 21.5°, the difference in light intensity is so large as to exceed a reference value of 5%).

FIGS. 6A to 6C are graphs explaining an example of an favorable combination of two reflectors of the reflector 13. In each of the graphs, curve L indicates the intensity (illuminance) of light emitted from the illuminating lamp 12, and curve R represents the intensity (illuminance) of light reflected by the reflector 13.

In FIG. 6A, an angle of the first reflector A is 25° and that of the second reflector B is 35° (sample C in TABLE 1). There is almost no difference in light intensity between the lamp 12 and the reflector 13 within each distance of 1.5 mm from the reading center (full width of 3 mm), and they are almost equal to each other in the reading center. In FIG. 6C, an angle of the first reflector A is 26.5° and that of the second reflector B is 35° (sample E in TABLE 1), and a difference of about 5% in light intensity is recognized in the reading center on the document glass 11. In FIG. 6B, an angle of the first reflector A is 22° and that of the second reflector B is 35° (sample D in TABLE 1), and a difference of about 5% in light intensity is recognized in the reading center on the document glass 11. Though not shown in TABLE 1 or the graphs in FIGS. 6A to 6C, the permissible angle of the second reflector B falls within the range of 33° to 37.5° as a result of the same simulation as that of TABLE 1 in which the permissible angle of the first reflector A is obtained.

Figure 7:
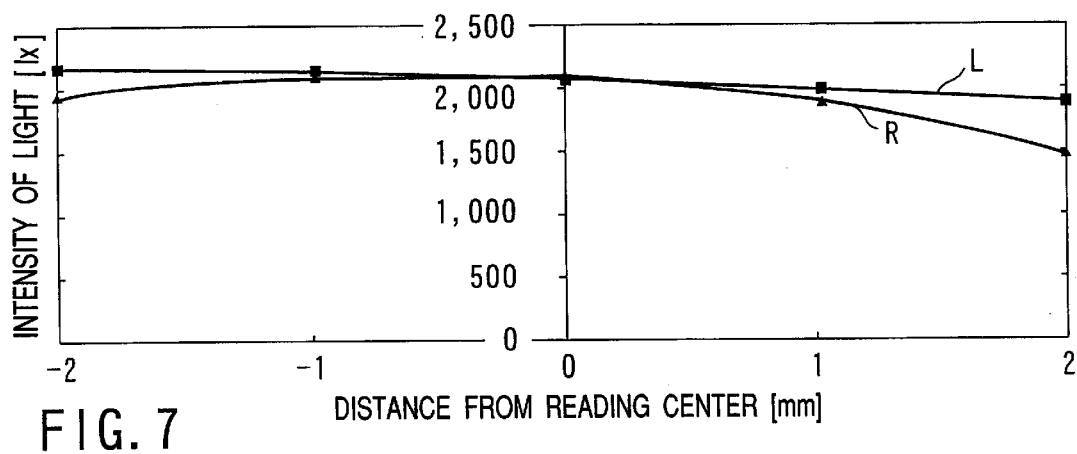
FIG. 7 is a graph explaining a measured value of the deviation of the illuminating light emitted under condition C (the angle of the first reflector is set to 25°) of TABLE 1 in the reflector shown in FIG. 4.

FIG. 7 is a graph showing an example of the intensity of light applied to the irradiation range of the document glass 11 by the reflector, which is actually measured by the image reader. Referring to FIG. 7, as the distance from the reading center increases, a difference in light intensity between the illuminating light of the lamp 12 and that of the reflector 13 becomes larger, but a difference in light intensity in the reading center can hardly be recognized.

FIGS. 8A, 8B and 9 are graphs explaining an example of using a combination of two reflectors when the angle of the reflector A is not favorable, or using at least one of reflector A and reflector B only, to compare them with the reflectors shown in FIGS. 6A to 6C. In each of the graphs, curve L indicates the intensity (illuminance) of light emitted from the illuminating lamp 12, and curve R represents the intensity (illuminance) of light reflected by the reflector 13.

In FIG. 8A, only the first reflector A is used (sample A in TABLE 1) and its angle is 25°. A difference in intensity between the light from the illuminating lamp 12 and that from the reflector A in the reading center on the document glass 11 is several tens of percent.

In FIG. 8B, only the second reflector B is used (sample B in TABLE 1) and its angle is 35°. A difference in intensity between the light from the illuminating lamp 12 and that from the reflector B in the reading center on the document glass 11 is several tens of percent as in the case where only the first reflector A is used.

In FIG. 9, the angle of the first reflector A is 21.5° and that of the second reflector B is 35° (sample F in TABLE 1), and a difference of about 6% in light intensity is recognized in the reading center on the document glass 11. Since a difference in light intensity between the example of FIG. 6B and that of FIG. 9 is small, the lower limit of the favorable angle of the reflector A is considered to be about 22.5° in view of an assembly error.

According to the image reader of the present invention described above, a flat reflector, which reflects light emitted from the illuminating light toward the document glass, is folded once in a first direction along the short sides of the document glass to have two planes. If the angle of each of the planes is optimized, the intensity of light applied from the reflector to the irradiation range on the document glass can be set almost equal to that of light applied from the illuminating lamp to the irradiation range on the document glass. Thus, even though a document to be read is formed by pasting two sheets and has a step, a shade can be prevented from occurring in the step.

The reflector need not be constituted of an expensive member having a high reflectivity but can be formed of a known aluminum member and, in this case, the image reader can be decreased in cost.

What is claimed is:

1. An image reader comprising:
   a holding glass to hold an object to be read, the holding glass being a rectangular, plate-like, flat plate having two pairs of sides that intersect each other at right angles;
   an illuminating unit, including a tube-like lamp and provided in parallel with one of the two pairs of sides of the holding glass to emit a light and illuminate an area having a given range on the holding glass; and
   a reflector, provided along the lamp of the illuminating unit, to receive the light from the illuminating unit and reflect the light toward an irradiation range from a direction opposite to a direction of the light emitted from the illuminating unit in order to irradiate the holding glass, the reflector being a flat member which is folded once in a direction parallel with the one of the two pairs of sides of the holding glass, to have a first reflection plane and a second reflection plane, an angle between the first reflection plane and a center of irradiation on the holding glass being smaller than that between the second reflection plane and the center of irradiation on the holding glass, the first reflection plane of the reflector being located such that the angle between the first reflection plane and the center of irradiation on the holding glass ranges from 22.5° to 26.5°, and the second reflection plane of the reflector being located such that an angle between the second reflection plane and the center of irradiation on the holding glass ranges from 33° to 37.5°;
   a converging lens to converge the light reflected by the object on the holding glass illuminated by the illuminating unit and the reflector; and
   a CCD sensor to receive the light focused by the focusing lens and outputting an electrical signal corresponding to the received light.

2. An image reader according to claim 1, wherein the first reflection plane is so arranged that it can reflect the light from the illuminating lamp of the illuminating unit to the irradiation range of the holding glass such that the virtual position of the illuminating lamp is located further from the holding glass than the illumination lamp in the direction orthogonal to the face of the holding glass, and it is on the other side than the illumination lamp with respect to the reading center in the direction parallel to the face of the holding glass.

3. An image reader according to claim 1, wherein the second reflection plane is so arranged that it can reflect the light from the illuminating lamp of the illuminating unit to the irradiation range of the holding glass such that the virtual position of the illuminating lamp is located further from the holding glass than the illumination lamp in the direction orthogonal to the face of the holding glass, and it is on the other side than the illumination lamp with respect to the reading center in the direction parallel to the face of the holding glass.

4. An image forming apparatus comprising:

an image reader including:
- a holding glass to hold an object to be read, the holding glass being a rectangular, plate-like, flat plate having two pairs of sides intersecting each other at right angles;
- an illuminating unit, including a tube-like lamp and provided in parallel with one of the two pairs of sides of the holding glass to emit a light and illuminate an area having a given range on the holding glass; and
- a reflector, provided along the lamp of the illuminating unit, to receive the light from the illuminating unit and reflect the light toward an irradiation range from a direction opposite to a direction of the light emitted from the illuminating unit in order to irradiate the holding glass, the reflector being a flat member which is folded once in a direction parallel with the one of the two pairs of sides of the holding glass, to have a first reflection plane and a second reflection plane, an angle between the first reflection plane and a center of irradiation on the holding glass being smaller than that between the second reflection plane and the center of irradiation on the holding glass, the first reflection plane of the reflector being located such that the angle between the first reflection plane and the center of irradiation on the holding glass ranges from 22.5° to 26.5°, and the second reflection plane of the reflector being located such that an angle between the second reflection plane and the center of irradiation on the holding glass ranges from 33° to 37.5°;

a converging lens to converge the light reflected by the object on the holding glass illuminated by the illuminating unit and the reflector;

a CCD sensor to receive the light focused by the focusing lens and outputting an electrical signal corresponding to the received light;

an exposing unit to emit exposure light, whose intensity varies with an output image signal generated from the image reader, to a predetermined position;

an image forming unit having a photo-sensitive body serving as a light acceptor, a developing unit capable of selectively supplying a visualizing material to the photo-sensitive body, and a transfer unit for transferring the visualizing material from the photo-sensitive drum to an image-transferred member, to form a visualizing-material image by supplying the visualizing material by the developing unit to a latent image formed on the photo-sensitive body by the exposure light emitted from the exposing unit;

an image-transferred member feeding mechanism to feed the image-transferred member to the transfer unit to transfer the visualizing-material member formed by the developing unit by the transfer unit of the image forming unit; and a fixing unit for fixing the visualizing-material image on the image-transferred member fed by the image-transferred member feeding mechanism.

* * * * *